United States Patent Office 2,963,500
Patented Dec. 6, 1960

2,963,500

ORGANOSILOXY SILALACTONES

Leo H. Sommer, State College, Pa., assignor to Dow Corning Corporation, Midland, Mich., a corporation of Michigan No Drawing. Filed Apr. 21, 1958, Ser. No. 731,072

5 Claims. (Cl. 260—448.2)

The present invention relates to organosiloxy silalactones and polymers thereof, and to methods for their preparation.

The monomeric lactones of this invention are of the general formula

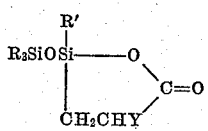

where R and R' are monovalent hydrocarbon radicals free of aliphatic unsaturation and Y is a methyl radical or a hydrogen atom. In polymeric form, such lactones can take either a cyclic or open chain structure, both having the formula

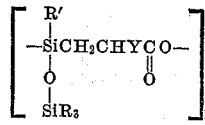

where $n$ is any integer greater than 1. The cyclic where $n$ is 2 thus has the structural formula

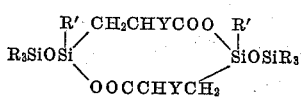

The open chain or linear polymeric forms consist of mixed molecular species in which $n$ can have values up to 1000 or more. In their linear form, the polymers in all probability are end-blocked with HOSi≡ groups at one end and —COOH groups at the other end.

The monomeric lactones of this invention are best produced by reacting a carboxyorganosiloxane of the general formula $R_3SiOSi(R')(CH_2CHYCOOH)OSiR_3$ by contacting it with $SOCl_2$ in a liquid phase and in the presence of pyridine, and isolating the lactone product, e.g., by fractional distillation. The symbols R, R', and Y in the carboxyorganosiloxane are as above defined. The reaction with $SOCl_2$ takes place at room temperature and is exothermic. Any temperature at which the reactants are in the liquid phase is operative, but the best yields can be obtained by heating the reaction mass at 38°–78° C. until gas evolution has ceased. The reaction takes place regardless of the relative amounts of the siloxane and $SOCl_2$ employed, but to maximize the yield of product and minimize the formation of by-products it is preferred to use approximately an equimolar ratio.

The pyridine is present as an HCl acceptor, and accordingly it is preferred to use it in a molar amount at least equal to or in slight excess of the molar amount of $SOCl_2$ employed. A large excess does no harm, but for economical reasons it is best to employ only up to about 1.25 moles pyridine per mole of $SOCl_2$. The process is operative with less than an equimolar amount of pyridine, but leads to increasing amounts of by-products until in the complete absence of pyridine, only compounds such as $R_3SiCl$, $R'Cl_2SiCH_2CHYCOCl$, and non-distillable residues are obtained. HCl acceptors other than pyridine can of course be used if desired, either in place of or in addition to the pyridine. For operating convenience it is desirable to conduct the reaction in the presence of an inert organic solvent such as an ether or hydrocarbon solvent.

Prolonged heating of the above carboxyorganosiloxane, e.g., at temperatures of 135°–225° C., or shorter periods at 225°–300° C., can alone produce both the monomeric and polymeric lactones of this invention, with by-production of $R_3SiOSiR_3$ and the evolution of water. Only small amounts of the monolactone are produced in this manner, however, and separating it from the carboxyorganosiloxane is extremely difficult under such circumstances. The polylactones, however, can be produced in good yields in this manner. The polylactones can also be produced by heating the monolactone.

The carboxyorganosiloxane necessary for the production of the lactones of this invention can be prepared by either of two primary methods. In the first method, an ester of the formula $R'Cl_2SiCH_2CHYCOOMe$ is prepared, e.g., by reacting $R'HSiCl_2$ with methyl acrylate or methyl methacrylate in the presence of chloroplatinic acid (as set forth in detail in the Speier and Hook Patent No. 2,823,218, issued February 11, 1958) thus producing the ester in which Y is hydrogen or a methyl radical, respectively. The ester is then reacted with glacial acetic acid, followed by the aqueous hydrolysis of the reaction product in the presence of hydrochloric acid. After distilling off the volatiles, the residual hydrolyzate is a viscous polymer containing [(HOOCCHYCH$_2$)(R')SiO] units. This polymer is then mixed with the hexaorganodisiloxane $R_3SiOSiR_3$, preferably in an amount of from 4 to 10 moles per mole of the starting ester. This mixture is stirred at room temperature in the presence of 0.5 to 3% by weight of concentrated $H_2SO_4$ based on the weight of the $R_3SiOSiR_3$ until an equilibrium is established. The mixture is then washed free of $H_2SO_4$, dried, and distilled. A flash distillation is preferable at this point to avoid indiscriminate and uncontrolled polylactone formation from the $$R_3SiOSi(R')(CH_2CHYCOOH)OSiR_3$$

product.

A second method for the preparation of the carboxyorganosiloxane intermediate where Y is hydrogen is to react $ClCH_2R'Si(OEt)_2$ with diethylsodiomalonate in the presence of sodium iodide, using diethyl carbitol as a solvent, to produce the compound $$R'(EtO)_2SiCH_2CH(COOEt)_2$$

The latter is then simultaneously decarboxylated and hydrolyzed by heating it with glacial acetic acid and concentrated hydrochloride acid. Removal of low boiling constituents leaves a viscous polymer containing $$[(HOOCCH_2CH_2)(R')SiO]$$

units. This polymer is then equilibrated with $R_3SiOSiR_3$ in the presence of concentrated $H_2SO_4$ as described above, and washed, dried, and distilled to provide the desired carboxyorganosiloxane.

Compounds of the formula $R'HSiCl_2$ and $R_3SiOSiR_3$ are well known materials, many of which are commercially available. Compounds of the formula $ClCH_2R'Si(OEt)_2$ are also well known, and can be prepared, e.g., by chlorinating $MeSiCl_3$ to form $ClCH_2SiCl_3$, Grignardizing the latter to form $ClCH_2R'SiCl_2$, and reacting this with ethanol.

As noted previously, R and R' can be any monovalent hydrocarbon radicals free of aliphatic unsaturation. For example, they can be alkyl such as methyl, ethyl, or octadecyl; aryl, e.g., phenyl, xenyl, or naphthyl; alkaryl such as tolyl or xylyl; aralkyl as exemplified by benzyl; or cycloaliphatic such as cyclohexyl. The R radicals in a particular compound can be the same or different, e.g., the hexaorganodisiloxane used in preparing the required carboxyorganosiloxane can be Me₃SiOSiMe₃, Me₂PhSiOSiMe₃
Me₂PhSiOSiPhMe₂

MePh₂SiOSiPh₂Me, MeEtPhSiOSiPhEtMe, etc. As with most organosilicon compounds, the lactones of the present invention have the best properties when the R and R' radicals are methyl, ethyl, or phenyl. Preferably not more than one R radical on any particular silicon atom contains more than two carbon atoms.

The monomeric and polymeric products of this invention undergo typical lactone reactions, and thus are useful as intermediates for the preparation of various organofunctional organosiloxanes. The monomeric form can be polymerized by heat (or the lower molecular weight polymers can be further polymerized) to form highly polymerized materials which are useful for the same applications as the well known conventional "silicone" fluids, resins, and rubbers, e.g., as potting and sealing compounds, electrical insulation, impregnating varnishes, and the like. If desired these compounds can be used in conjunction with conventional fillers such as silica, titania, ferric oxide, and asbestos or glass fibers.

The following examples are illustrative only. The symbols Me, Et, and Ph have been used here and throughout this specification as representative of methyl, ethyl, and phenyl radicals, respectively.

*Example 1*

ClCH₂MeSi(OEt)₂ was prepared by slowly adding ClCH₂MeSiCl₂ to anhydrous ethanol in a molar ratio of 1:2, warming the mixture until HCl evolution ceased, and distilling off the product at 82° C./48 mm. Hg. Diethyl sodiomalonate was prepared by heating a mixture of 480 ml. diethyl Carbitol, 24.3 g. sodium, and 172.2 g. diethyl malonate at 90° C. After cooling, 15 g. sodium iodide was added and 165.9 g. of the ClCH₂MeSi(OEt)₂ was slowly added to the mixture with stirring. After heating this mixture overnight at 120° C., the reaction product was cooled, filtered, and the filtrate distilled to give the product (EtO)₂MeSiCH₂CH(COOEt)₂

B.P. 172–173° C./26 mm. Hg.

A mixture of 154.1 g. of the (EtO)₂MeSiCH₂CH(COOEt)₂

150 ml. concentrated hydrochloric acid, and 250 ml. glacial acetic acid was heated at reflux for 24 hours. Ethyl acetate was distilled off, and then all low boiling constituents were removed to a temperature of 150° C. for 2 mm. Hg, leaving a viscous polymer containing [(HOOCCH₂CH₂)MeSiO] units. This polymer was mixed with 602.1 g. Me₃SiOSiMe₃ and 7 ml. of concentrated sulfuric acid for 72 hours at room temperature. The mixture was then washed with water, dried over anhydrous magnesium sulfate, and flash distilled to give the carboxyorganosiloxane Me₃SiOSi(Me)(CH₂CH₂COOH)OSiMe₃ in 77.3% yield, B.P. 133° C./5 mm. Hg.

To a mixture of 62.7 g. (0.213 mole) of the above carboxyorganosiloxane and 20.1 g. (0.254 mole) of dry pyridine there was slowly added 25.3 g. (0.213 mole) SOCl₂. The temperature rose spontaneously to 35° C. and heating the mixture at 38° C. gave a moderate rate of gas evolution. After the addition was complete the reaction mass was heated at 50° C. for 4 hours. Low boiling constituents were removed at reduced pressure, anhydrous diethyl ether was added to the residue, and the mass was filtered. The ether was flash distilled off and the residue was fractionally distilled to provide a 76.4% yield of the monolactone

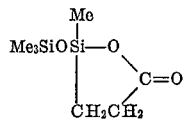

boiling at 93° C./3.5 mm. Hg.

*Example 2*

MeCl₂SiCH₂CHMeCOOMe was produced by the reaction of MeHSiCl₂ with methyl methacrylate at 110° C. in the presence of 1×10⁻⁴ mole of chloroplatinic acid per mole silane. A mixture of 202.6 g. (0.94 mole) of this ester and 270 ml. glacial acetic acid reacted vigorously when a small piece of ice was added thereto. There was then added 75 ml. water and 50 ml. concentrated hydrochloric acid, and the mixture was heated at reflux overnight. Methyl acetate, HCl, and acetic acid were distilled off to a final temperature of 150° C. at 18 mm. Hg, leaving a sticky polymer of the unit formula [(HOOCCHMeCH₂)MeSiO].

When the above polymer is mixed with 1296 g. (8 moles) of Me₃SiOSiMe₃ and 14 ml. of concentrated sulfuric acid for 72 hours at room temperature, then washed, dried, and distilled as in Example 1, the carboxyorganosiloxane Me₃SiOSi(Me)(CH₂CHMeCOOH)OSiMe₃ is obtained. When this carboxyorgansiloxane is mixed with pyridine and reacted with SOCl₂ in the manner of Example 1, distillation of the reaction mass provides the monolactone

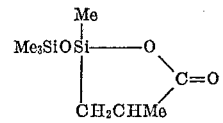

*Example 3*

By reacting PhHSiCl₂ with methyl acrylate in the presence of chloroplatinic acid, there is produced the corresponding ester, which upon reaction with acetic acid and hydrolysis as in Example 2 produces the polymer of the unit formula [(HOOCCH₂CH₂)PhSiO]. The equilibration of this polymer with PhMe₂SiOSiMe₂Ph in the presence of concentrated sulfuric acid by the technique set forth in Example 1 provides the carboxyorganosiloxane Me₂PhSiOSi(Ph)(CH₂CH₂COOH)OSiMe₂Ph. Mixing the latter with pyridine and reacting it with SOCl₂ in the manner of Example 1 produces the monolactone

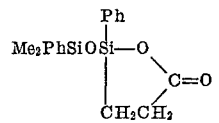

*Example 4*

A sample of the

Me₃SiOSi(Me)(CH₂CH₂COOH)OSiMe₃ from Example 1 was heated at atmospheric pressure until it reached a temperature of 300° C. The volatile materials which were evolved were collected as formed and removed from the system, and were found to consist of water and Me₃SiOSiMe₃. Distillation of the residue showed that about 36% of the starting material had been converted to cyclic polylactones of the formula

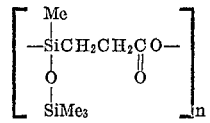

where n was from 2 to 5. A sample of the monolactone from Example 1 was heated openly on a hot plate for 60 seconds, and infrared analysis showed that there had been a 30% conversion to the above polylactones. A second sample of the monolactone was heated on a steam bath for 90 hours, and a viscous polylactone was formed. Infrared analysis of the latter showed that there had been almost a complete conversion to an open chain structure of the above formula where $n$ was an undeterminable large number.

That which is claimed is:

1. A lactone of the general formula

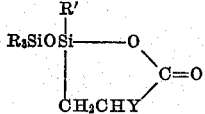

where R and R' are monovalent hydrocarbon radicals free of aliphatic unsaturation, and Y is selected from the group consisting of a methyl radical and a hydrogen atom.

2.

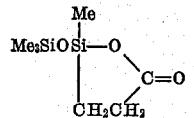

where Me is a methyl radical.

3. An organosiloxane consisting essentially of units of the general formula

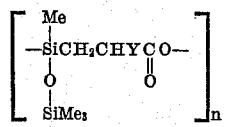

where $n$ is an integer greater than 1, Y is selected from the group consisting of a methyl radical and a hydrogen atom, and Me represents a methyl radical.

4. The method which comprises reacting an organosiloxane of the general formula

by contacting it with $SOCl_2$ in a liquid phase and in the presence of pyridine, and isolating the product

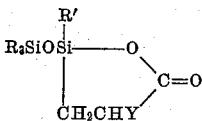

in the above formulas R and R' being monovalent hydrocarbon radicals free of aliphatic unsaturation and Y being selected from the group consisting of a methyl radical and a hydrogen atom.

5. The method which comprises reacting an organosiloxane of the general formula

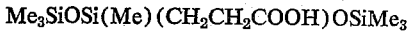

by contacting it with $SOCl_2$ in a liquid phase and in the presence of pyridine, and isolating the product

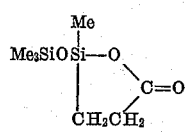

in the above formulas the symbol Me representing a methyl radical.

References Cited in the file of this patent

UNITED STATES PATENTS 2,635,109    Sommer              Apr. 14, 1953

FOREIGN PATENTS 788,842    Great Britain         Jan. 8, 1958

OTHER REFERENCES

Sommer et al.: "Jour. Am. Chem. Soc.," vol. 78 (May 1956), pp. 2010–15.

Dolgov et al.: "Izvestia Akad. Nauk," USSR, 1957, p. 968–71 (Chem. Abstracts, vol. 52 (1958), p. 4473–4).